United States Patent
Marks et al.

(10) Patent No.: US 8,655,152 B2
(45) Date of Patent: Feb. 18, 2014

(54) METHOD AND SYSTEM OF PRESENTING FOREIGN FILMS IN A NATIVE LANGUAGE

(71) Applicants: Darryl Marks, Beverly Hills, CA (US); Raymond McIntyre, Jr., Toluca Lake, CA (US)

(72) Inventors: Darryl Marks, Beverly Hills, CA (US); Raymond McIntyre, Jr., Toluca Lake, CA (US)

(73) Assignee: Golden Monkey Entertainment, Beverly Hills, CA (US)

(*) Notice: Subject to any disclaimer, the term of this patent is extended or adjusted under 35 U.S.C. 154(b) by 0 days.

(21) Appl. No.: 13/739,993

(22) Filed: Jan. 11, 2013

(65) Prior Publication Data

US 2013/0195428 A1    Aug. 1, 2013

Related U.S. Application Data

(60) Provisional application No. 61/593,160, filed on Jan. 31, 2012.

(51) Int. Cl.
*H04N 5/93* (2006.01)

(52) U.S. Cl.
USPC .......................................... 386/278

(58) Field of Classification Search
None
See application file for complete search history.

(56) References Cited

U.S. PATENT DOCUMENTS

| | | | |
|---|---|---|---|
| 4,260,229 A | 4/1981 | Bloomstein | |
| 4,600,281 A | 7/1986 | Bloomstein | |
| 4,827,532 A | 5/1989 | Bloomstein | |
| 5,502,790 A | 3/1996 | Yi | |
| 5,608,839 A | 3/1997 | Chen | |
| 5,615,301 A | 3/1997 | Rivers | |
| 5,630,017 A | 5/1997 | Gasper et al. | |
| 5,657,426 A | 8/1997 | Waters et al. | |
| 5,729,694 A | 3/1998 | Holzrichter et al. | |
| 5,818,461 A | 10/1998 | Rouet et al. | |
| 5,826,234 A | 10/1998 | Lyberg | |
| 5,880,788 A | 3/1999 | Bregler | |
| 5,884,267 A | 3/1999 | Goldenthal et al. | |
| 5,907,351 A | 5/1999 | Chen et al. | |
| 6,097,381 A | 8/2000 | Scott et al. | |
| 6,208,356 B1 | 3/2001 | Breen et al. | |
| 6,232,965 B1 | 5/2001 | Scott et al. | |
| 6,366,885 B1 | 4/2002 | Basu et al. | |

(Continued)

FOREIGN PATENT DOCUMENTS

| | | |
|---|---|---|
| EP | 0 674 315 | 9/1995 |
| WO | WO 97/15926 | 5/1997 |
| WO | WO 2011/124830 | 10/2011 |

OTHER PUBLICATIONS

M. Malciu, F. Prêteux, "MPEG-4 Compliant Tracking of Facial Features in Video Sequences", Proceedings EUROIMAGE, May 2011, 108-111, Mykonosg, Greece.

*Primary Examiner* — Hung Dang
*Assistant Examiner* — Sunghyoun Park
(74) *Attorney, Agent, or Firm* — Cislo & Thomas, LLP

(57) ABSTRACT

A process for presenting live action foreign language feature films in a native language by replacing the physical mouth positions of the original actors to match a newly recorded audio track in a different language with the original and/or replacement actors keeping the essence of the original dialect, while achieving the illusion that the content was originally filmed in the new voice over language. This process applies an artistic, multifaceted approach rather than a purely procedural approach, and utilizes a combination of visual effects techniques to achieve realistic lip sync animation to be convincing to the viewing audience.

19 Claims, 1 Drawing Sheet

(56) References Cited

U.S. PATENT DOCUMENTS

| | | |
|---|---|---|
| 6,449,595 B1 | 9/2002 | Arslan et al. |
| 6,492,990 B1 | 12/2002 | Peleg et al. |
| 6,665,643 B1 | 12/2003 | Lande et al. |
| 6,697,120 B1 | 2/2004 | Haisma |
| 6,751,340 B2 | 6/2004 | Prokoski |
| 6,778,252 B2 | 8/2004 | Moulton |
| 7,109,993 B2 | 9/2006 | Peleg et al. |
| 7,145,606 B2 | 12/2006 | Haisma et al. |
| 7,209,882 B1 | 4/2007 | Cosatto et al. |
| 7,257,538 B2 | 8/2007 | Qian |
| 7,369,992 B1 | 5/2008 | Cosatto et al. |
| 7,768,528 B1 | 8/2010 | Edwards et al. |
| 7,933,772 B1 | 4/2011 | Cosatto et al. |
| 2008/0101726 A1* | 5/2008 | Myers et al. ............... 382/289 |
| 2008/0215984 A1* | 9/2008 | Manico et al. ............. 715/730 |
| 2008/0306995 A1* | 12/2008 | Newell et al. ............ 707/104.1 |
| 2009/0234636 A1* | 9/2009 | Rylander ..................... 704/3 |

\* cited by examiner

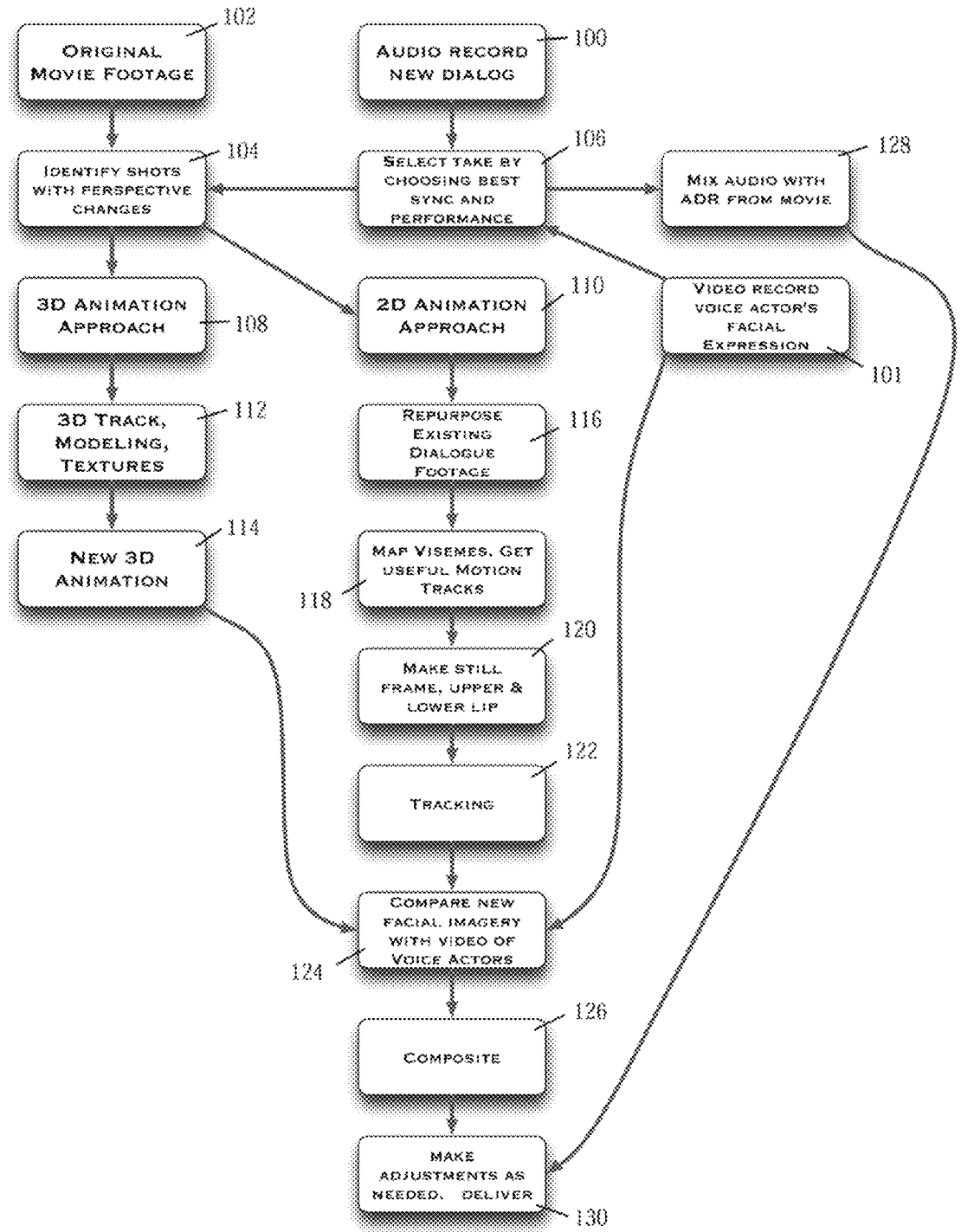

METHOD AND SYSTEM OF PRESENTING FOREIGN FILMS IN A NATIVE LANGUAGE

CROSS-REFERENCE TO RELATED APPLICATION

This patent application claims the benefit of Provisional Patent Application Ser. No. 61/593,160, entitled "Method and System of Presenting Foreign Films in a Native Language," filed Jan. 31, 2012, which application is incorporated in its entirety here by this reference.

TECHNICAL FIELD

This invention relates to methods and systems for converting foreign films into a native language.

BACKGROUND

Lip synchronization (lip sync) is a technical term for matching a character's lip movements with recorded speech. Most people have an awareness of correct mouth movement when people speak as in an animation film, and they can recognize bad lip-sync when they see it as well. Viewers expect a realistic level of lip sync.

There are many devices/approaches to generating lip synchronization to new audio tracks. Most of them utilize computer automation by using speech recognition and/or visual capturing techniques. These types of systems work for an actor where no perspective shift or change occurs, meaning the camera does not move around the actor or the actor does not turn his head. These approaches, however, will not work once a perspective shift does occur, and perspective shifts occur throughout any movie. Perspective shift (camera or head movement) shots require the use of 3D match moving, creating new 3D lip geometry, skin texturing, etc., and then compositing the new computer-generated image (cgi) created lip.

In one case, the system assigns a numeric value to % Mouth Open of the original and then to stretch or shrink the mouth to the new position to fit the new dialogue. The crux of this approach is an algorithm; that for each pixel of the original source footage related to the mouth, determines the intensity of the pixel, and then based on the newly recorded video of an actor delivering the new dialogue, determines the intensity of the corresponding pixel, and replaces the original pixel with the intensity of the new pixel. They do not describe how they correlate pixels from the original actor to pixels from an entirely different actor with an entirely different anatomical head shape and head position relative to camera, and different skin and lip color.

The new actor is shot with a different camera, which causes differences in resolution, and a different lens which causes a different amount of lens warping and pin cushioning leading to pixel inaccuracies. Variation in mouth size and shape as well as different size lips between the original actor and the new voice over actor would cause an automated approach difficulty in discerning the difference between pixels that vary either due to positioning for different dialogue or simply because of the anatomical mismatch in the actors themselves. This could cause unreliability in this approach.

To better illustrate this point, two actors speaking the exact same dialogue (same language) would have differences in inflection of voice thus a different amount of mouth opening and pursing as well as differences due to their anatomical differences. Now compound this issue with two actors speaking different languages on top of everything just mentioned and the results would be unpredictable in trying to determine pixel correlations between original actor and voice over actor.

Another important factor is that the voice over actor would be photographed in an entirely different environment with entirely different lighting conditions and shadows affecting the voice over actors face when compared to the original actor, thus differences in pixel intensities could result from this alone. The new actor is said to be videotaped, so there is no resolution match, and no aspect ratio match. All of the above notations could cause pixels to be different simply because of the issues mentioned instead of difference due to mouth positions, which could lead to inaccurate results in pixel intensity choices.

Another technique uses the built in MPEG-4 facial tracking features. Lip objects of the original actor are tracked, the lip objects of the voice over actor delivering the new audio are tracked, then the voice over actor's lip objects are added to the original actor and displayed. However, it is unclear how the voice over lip objects are blended onto the geometry of the original actor to be smooth and seamless. It is also unclear how facial expressions (cheek positions, facial wrinkles, smiles etc.) that occur in the original dialogue is made to fit the new dialogue. It is unclear how this technique manages skin texture generation, lighting and shadow methodologies for the new skin that needs to be rendered due to the new lip object. If the new lip objects from the new video are simply composited onto the original actor, it is not possible that they will replace the original lip objects perfectly since the new actor was not photographed under identical lighting conditions or relationship to the camera or with the same camera and lens package.

As noted in "MPEG-4 compliant tracking of facial features in video sequences" (http://www-artemis.it-sudparis.eu/Publications/library/ICAV3D01-malciu.pdf) Marius Malciu and Françoise Prêteux explain the difficulties related to "face and facial expression recognition and model-based facial image coding. Though intuitive for biological vision systems, locating faces and facial components in video sequences remains today a challenging and widely open issue in computer vision. The main difficulties encountered refer to the complexity and high variability of face morphology and head motion, and the lack of universal assumptions on the scene structure, which often involves arbitrary and complex background together with unknown and variable lighting conditions".

Another technique includes compression of talking head video and animation of synthetic faces. Synthetic faces to replace original actors face raises a whole host of problems including modeling to fit the original actor, 3D matching of movements to the original actors movements, texturing, lighting, and shadowing in a 3D rendering package, and compositing and blending onto the original actor. These problems are not addressed by the prior art.

In another technique shape vectors of each frame are warped to a common standard frame thereby generating an aligned shape vector and a transformed image for each frame. The problem with this technique is that it can lead to pixels that have been warped a large distance (when the standard frame is different enough from the actual frame) and will look unnatural and non-realistic.

In another technique vicinity-searching, three-dimensional head modeling of the original speaker, and texture mapping are used to produce new images which correspond to the dubbed sound track. A generic three-dimensional head model is fitted to the actor's two-dimensional head picture. The fitted three-dimensional head model parameters may be tracked throughout the movie, from one frame to its successor, iteratively in an automated computerized way and creating a library of reference similarity frames.

However, such approaches require, among other things, a three-dimensional head model for every speaking actor in a movie, match-moving of camera movement and every actor's head motion throughout the movie, texture mapping and lighting every actor to fit every varied scene of the movie requiring thousands of lighting setups. The amount of time, effort and expense to achieve this approach is mind-boggling.

In another technique a database is used to obtain images for phonemes, and morphing techniques are used to create transitions between the images. Different parts of the images can be processed in different ways to make a more realistic speech pattern.

Considering all the techniques that address this subject matter, to date, not a single live action movie has been released by any of these other sources that have actually modified the mouth position of the actors in a live action movie to fit the new dialogue. Therefore, there is still a need for dubbing technology that can cost-effectively and efficiently present a foreign film in a native language by giving the appearance that a foreign actor is speaking in the native language.

SUMMARY

The present invention is directed to a new system and process that achieves a seamless and properly executed lip sync effect for a foreign language film with a new audio track in a native language as opposed to a dubbed movie with no lip sync at all. The intention of the process is to change a human character's lip sync (change the actual shapes the mouth forms so that it appears to deliver the newly recorded language rather than the original one) to make it appear as if that actor or character is speaking a different language (e.g., English) rather than the one that was recorded when the movie was originally made. This process utilizes an artistic approach using visual effects techniques such as rotoscope, 3D camera match moving and 3D object match moving, morphing and warping, tracking and compositing, color and texture manipulation, skin facial texture creation, rendering utilizing sub-surface scattering, final composite, and blending onto the original character's face. In every movie, there is a myriad of facial expressions in the speaking parts of an actor, and no single approach can accurately match the lip sync to a new language. It is a matter of using an artistic, multifaceted approach to modify and adjust nearly every frame of an actor speaking in the sequences when the actor faces the audience.

BRIEF DESCRIPTION OF DRAWINGS

FIG. 1 is a block diagram showing the methodology of the present process.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

In general, voice over actors are audio and video recorded 100, 101 performing the scene from an original recording 102, such as a movie or television recording. Segments of the original recording having perspective changes may be identified 104. Segments of the voice over recording are selected 106 based on the best synchrony and performance when compared to the corresponding segment of the original recording. Based on the extent of the differences, a best transformation methodology 108, 110 is selected. If the differences are extensive a 3D technique 108 is used. The original actor is tracked, modeled and textured 112 and a new 3D animation is created 114.

If the differences are minimal, a 2D technique 110 is used. In the 2D technique, existing dialogue footage is repurposed 116. Visemes are mapped 118. Still frames are created 120. The original actor and voice over actors are tracked 122 during a given segment and compared 124. The transformation or conversion of the original actor's mouth to match the mouth movements of the voice over actor is performed 126. The two audio recordings are mixed 128 with automated dialogue replacement to replace the voice track of the original actor with the voice track of the voice over actor. The work is reviewed for quality control 130 and adjustments are made.

An original recording (audio and video recordings) of a foreign film contains numerous scenes with a variety of actors having a speaking line in the foreign language. Each of these speaking lines must be translated from the original, foreign language in which the original recording was made, into a native language of the viewer. The term foreign refers to the fact that a film is predominantly spoken in a language other than the predominant language spoken in the country of the viewer. Native refers to the language predominantly spoken and understood by the viewer. Thus, the terminology is used from the perspective of the viewer wanting a translation.

Preferably, voice over actors will be selected based on how closely the voice over actor's accent and dialect matches the original actor's accent and dialect.

In the first step, for every speaking character in the original recording, segments of an audio recording and video recordings of a counterpart voice over actor is made speaking in the native language based on a dialogue transcribed into the native language (transcribed speaking line) from the original language to create a transcribed segment. A segment is a reasonable duration of the film that can be converted into a native language. For example, when there is a lot of animation by the actor, or quick changes in camera angles, the segment may be a few seconds or a few words. However, when there is a long monologue by a single actor with very little changes in facial expression and camera angles, then the segment can be much longer than just a few seconds or a few words. In cases such as these, the next segment may be when the camera angle changes or when the original actor makes a large movement to change the perspective of his or her face being shot. Thus, a segment may be a specific number of frames, a single continuous shot, one scene, or a sequence of scenes.

A shot refers to an individual cut in a movie in which the camera has one perspective; for example, a camera angle showing one actor over the shoulder of another actor. Though there might be much dialogue spoken during this shot, it is one continuous shot as long as the camera does not change perspective. Moreover, if the camera moves in one continuous take, without cutting away, this also is a single shot.

A frame refers to a unit of time and/or length within a shot. Within a single shot, an actor might begin speaking on frame 10 and stop talking on frame 60. (There are usually 24 frames within a second of film.) A scene refers to one or more shots comprising one location. A sequence refers to a series of scenes in a related event. For example, a car chase is a sequence comprising shots and scenes of the interior of the car as well as shots and scenes of the exterior street environs.

Preferably, two video recordings are made for the voice over actor for every segment of an original recording having a speaking line, a direct face-on angle and an appropriate camera angle that matches the camera angle shot in the original video recording (matched camera angle) when the original actor is speaking the speaking line that is being translated by the voice over actor. The voice over actor is to speak the transcribed dialogue with the same inflection, tone, and facial expression as done by the original actor within the film so as to conform the translated dialogue delivery from the voice over actor to best-fit the facial expressions (mad, sad, etc.) of the original actor. Adjustments to the delivery of the speaking line of the voice over actor may be made to match the original actor and to match the timed-length of speaking of the original dialogue.

In some embodiments, photographs of the voice over actor are also taken with a face-on camera angle to create a face-on photograph, and a matched-camera angle to create a matched-angle photograph. These shots can be used to replace mouth movements of the original scene where in the translated scene there would not be any mouth movements.

The imagery from the face-on and matched angle videos and photographs becomes a visual guide for the digital artist to recreate new lip synchronization footage from both camera angles (direct face-on and matched-angle) using visemes as references when manipulating the lip movements of the original actors in the scene reciting a speaking line to correspond to the voice over actors mouth movements of the same speaking line.

Once the audio and video recordings have been completed for the voice over actors, segments of the matched-angle recording of the voice over actor can be overlaid and compared with the video recording with the original actor of the same segment to determine the best synchronization. Various techniques can be used for the comparison, such as picture-in-picture, split screen, ghost image overlay, and the like. Exposure sheets can be created to determine phoneme and corresponding viseme positions for the translated speaking line in each frame.

In some embodiments, the artists create an exposure sheet based off of the waveform of the new audio recording to map out the visemes of the new dialogue track in their segment. For example, at frame 31 there is an "M", at frame 34 there is an "O", etc. This will serve as a guide for where the new animated visemes should occur.

The artist also may create a frame of each original actor at rest (still frame) that is a neutral face position and will be used as needed when the actor is not speaking or emoting. Still frames can be taken at direct face-on angles and various other angles so as to improve the probability that there will be a matched camera angle. This should be accomplished for every shot in which the speaking original actor appears. Thus, there will be many still frames for each speaking original actor. For example, a single shot may require more than one still frame for an original actor if the actor's head changes perspective substantially enough to require one for each perspective.

Once the original recording and the voice over recordings have been compared, the artist must choose the best methodology or approach to change existing mouth visemes of the original actor to match the visemes of the voice over actor speaking the same speaking line in a native language. The artist can choose either a 2-dimensional (2D) approach or a three-dimensional (3D) approach for each character in each segment. This will be based on the camera motion and each characters inherent motion, and how much speaking the character actually does, as well as the exposure sheets created.

The 2D technique refers to an approach that uses the existing pixels within the photographed plate from the original movie. The pixels can be manipulated using various tools described herein. This approach works for scenes with less camera and character movement. Often times with this approach, lip and facial image elements are borrowed from other frames within the original recording. For instance, if an original actor makes the appropriate "W" mouth position for a particular phoneme, but at the wrong frame for a given translated speaking line, that "W" will be rotoscoped and tracked to the characters head and composited at the frame that matches the translated speaking line.

The 3D technique is referring to an approach that involves creating digital geometry to match an original actor's facial structure, and project the skin texture from the original actor back onto the created geometry. This computer generated image can then be integrated back into the original recording in ways described herein. This approach works for scenes with more complex character and camera movement.

Once the best techniques have been decided upon, the artist executes the work to change the mouth positions of the original actor to match the mouth position of the voice over actor, and render the completed result to create a modified original speaking actor, now appearing to speak the native language.

It is very unlikely that any one shot can be solely constructed from utilizing existing frames of the actor's performance without creating new animation. Almost all of the shots will involve a combination of manipulating existing footage, and creating new animations from a 2D or 3D approach as described below.

When there is minor face movement and little change in perspective of an original actor in a segment, an artist can use a 2D animation approach utilizing a combination of techniques such as warping, painting, pixel tracking, planar tracking, rotoscoping, replacing with similar frames from the actual actor and compositing. In most cases, an actor's lips and chin will need to move upward or downward from the original position (Source) to the desired position (Target) as determined by the voice over actor's recording.

First the original actor needs to be tracked, using readily available tools. This is the process of picking a certain point based on a feature, e.g. a chin cleft, and determining its position on the X, Y, and Z axis relative to a camera shooting the original actor (original camera). Generally several points are used to calculate rotation and skew. This data will be used throughout the rest of the process so that any work done, or imagery created, can be integrated into the scene.

Next, the target is derived from the video recording of the voice over actor by the same tracking techniques as noted above relative to a camera shooting the voice over actor (voice over camera). This target is then assigned to the original actor and becomes the desired lip and facial expression for the original actor. This process is done iteratively using a computer frame by frame.

Once these calculations are done, the artist will employ techniques based on the requirements of the scene. In a simple scene, where the actor is facing the camera, and there is little motion from the actor, video footage recorded of the voice over actor will be used as the guide. The visemes from the recorded work from the original/and or voice actor are used as a guide for which to modify the mouth movement of the original actor. These effects are isolated to the required areas with accurate hand animated stencils (Rotoscope) around key features such as lips, chin, teeth, tongue, and any other part of the face that moves during the act of speech. These methods are combined to modify and change the features of the lips and face to make it appear as if certain visemes are occurring at specific points, in sync with the new dialogue.

At times, segments from the original actor's performance may be re-timed to run forwards or backwards, or faster or slower, depending on the artist's need for a particular lip shape. By retiming, this will allow existing facial shapes of the original actor from the original dialogue to be used to fit the new dialogue of the voice over actor. In other words, the original actor's sequence of mouth movements from a first segment can be replaced with the original actor's sequence of mouth movements from a second segment, if the original actor's sequence of mouth movements from the second segment matches the voice over actor's sequence of mouth movements speaking the speaking line in the native language in the first segment. In some embodiments, retiming may not be necessary.

On frames where the original actor was talking initially but is no longer speaking on the same frame in the desired dialogue, a 'Neutral' face position (derived from the still frame) is used to replace the animated face position of the original actor so that any unwanted facial movements are no longer present.

Scenes with large difference between the original facial movement and the required movement for the new language can prove to be too extreme for simple warping and morphing. In these cases more complex rotoscoping and compositing will be used, borrowing facial movements from surrounding, similar frames of the sequence.

The look of the original motion picture is preserved at all times, since the process uses the skin, lighting, and facial features of the original actors at all times. This allows the process not only to achieve the goal of an alternate language being spoken with proper lip synchronization, but to achieve it in such a way that is in line with Motion Picture Industry standards for quality and convincing, photo-realistic cinematography.

When an original actor's motion involves significant perspective changes and/or a large degree of movement that would make it difficult to create new lip synchronizations entirely using rotoscoping, tracking and "2D" compositing, morphing, and warping techniques, then 3D modeling, texturing and lighting of the actor's facial features are used, thus creating an artificial animated image of the face or portion of the face. This computer generated image ("CGI") can then be integrated back into the original movie photography. A facial feature can be any feature of the head or face of the speaking actor. In particular, the feature may be close to the speaker's mouth. For example, the head feature may be a cleft on the chin, a dimple, a mole, a birthmark, a scar, or any other visible mark near the mouth that can be tracked.

The first requirement for the 3D technique is to perform 3D tracking of the original actor. This is similar to the tracking described above, but takes it a step further in that the position and movement, and lens information from of the original camera is calculated to recreate the camera motion for a given scene (3D Camera). With both the camera movements and the original actor's motions/movements tracked, a specialist will then perform a 3D match-move of the original character's face to determine the actor's position in the scene relative to the camera.

A digital model is created to mimic the shape and motion of the original actor's head. This digital model will be created using several images of the actor from the movie itself and then applying off the shelf image modeling techniques to create a digital wire frame of the actor's face. A specialist will then animate the mouth and facial movements of this model to achieve the desired lip synchronization by matching the desired voice over actor as described above. Rotoscope is used to extract the hair, skin, color and lighting from the original actor as captured in the original photography and becomes the texture projected onto the 3D model. In the rendering process, the new skin, lighting and shadows are matched to the original actor. This results in the newly created mouth and lower face having the exact look of the original, mouth movements matching the movements of a different language.

This is rendered out as a moving image sequence through the 3D Camera and composited with the original plate photography. At this point the process may rely on its 2D approach to work with this new rendered element and seamlessly blend into the original actor's face. Again, segments of the original actor's performance may be re-timed and used the new dialogue as discussed above along with the still frames as necessary.

Once the rendering is complete, a quality control check is performed for the overall look, feel, and accuracy of the lip synchronization with the translated speaking lines. As with any photo-real visual effects challenge, special attention must be given to the blending of any newly created elements with the existing faces, including matching colors, shadows, light, motion blur, focus and grain/noise. There will be various compositing clean up issues related to the blending of the new and original elements. Fixes may include edges of the still frame used to create new animation needing more work, paint fixing objectionable areas, color correcting subtle lighting changes on a face, and/or adding more motion blur for realism.

The artist must compare the resulting facial imagery of the modified original actor by compositing a picture-in-picture of the recorded video of the voice over actor to determine accuracy of the lip sync work. The new lip movements in addition to accurately matching the voice over actor must also look 100% believable and appear photo-realistic so that it is convincing to an audience. Final adjustments will be made at this stage to ensure reality so that the altered imagery appears as if it was part of the original photography.

The final step involves automated dialogue replacement and audio mixing. The audio tracks chosen from the first step are mixed in with the audio from the original movie, replacing the voice tracks. Industry standard audio mixing will then take place to integrate the new voice track into the original audio track with the original sound and music keeping the integrity and essence of the original foreign language film.

Any of these steps can be carried out by or with the assistance of a specialized computer or a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an apparatus or device that utilizes or implements electronic, magnetic, optical, electromagnetic, infrared signal or other propagation medium, or semiconductor system. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the computer system either directly or through intervening I/O controllers.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for converting a foreign film into a native language, comprising:
   a. for every segment of an original recording having a speaking line and associated facial expressions recorded at a specific perspective view of an original actor in the foreign film:
      i. audio recording a voice over actor speaking the speaking line in the native language to create a native language audio recording;
      ii. video recording the voice over actor during the audio recording from a face-on camera angle to create a face-on video recording;
      iii. video recording the voice over actor during the audio recording from a matched camera angle to create a matched-angle video recording;
      iv. photographing the voice over actor from the face-on camera angle to create a face-on photograph;
      v. photographing the voice over actor from the matched camera angle to create a matched-angle photograph;
      vi. adjusting a delivery of the speaking line of the voice over actor, wherein adjusting the delivery of the speaking line comprises:
         1. adjusting facial expressions of the voice over actor reciting the speaking line in the native language to best-fit the facial expressions of the original actor reciting the speaking line ("original speaking actor"),
         2. adjusting a duration of speech of the voice over actor to recite the speaking line in the native language to match a duration of speech of the original speaking actor,
      vii. using an imagery selected from the group consisting of the face-on video recording, the matched-angle video recording, the face-on photograph, and the matched-angle photograph as a visual guide to permit a digital artist to recreate native language visemes;
   b. overlaying and comparing one of the segments of the original recording containing the speaking line with a corresponding segment of the matched-angle video recording of the voice over actor to create an exposure sheet to determine a viseme position for the native language audio recording;
   c. checking the exposure sheet with a waveform of the native language audio recording to map out the native language visemes of the native language audio recording, wherein the exposure sheet comprises a frame number and a native language phoneme;
   d. creating a still frame of the original speaking actor at rest that is a neutral face position of the original actor while the original actor is not speaking or emoting;
   e. choosing a best methodology to change original visemes of the original speaking actor, the best methodology selected from the group consisting of a 2D technique and a 3D technique, wherein
      i. the 2D technique uses existing pixels within a photographed plate of the original recording, wherein existing pixels of lip and facial image elements are taken from other frames within the original recording in which the original speaking actor's lip and facial image elements matches the voice over actor's lip and facial image elements at a different frame, and wherein
      ii. the 3D technique comprises
         1. creating a digital geometry to match the original actor's facial structure at a particular frame,
         2. projecting a skin texture of the original actor back onto the digital geometry, and
         3. integrating the digital geometry back into the original recording;
   f. executing work to change a mouth position of the original actor to match the voice over actor reciting the speaking line to create a modified original speaking actor;
   g. performing quality control for an overall look, feel, and accuracy of a conversion to the native language, wherein special attention is given to a blending of any newly created elements with the original actor's face, the newly created elements selected from the group consisting of colors, shadows, light, motion blur, focus, grain, and noise;
   h. comparing a resulting facial imagery of the modified original speaking actor and the voice over actor by compositing a picture-in-picture of the recorded video of the voice over actor to determine accuracy of the conversion; and
   i. audio mixing to replace a voice track of the original actor with a voice track of the voice over actor, and integrate the voice over actor's voice into an audio track for the original recording.

2. The method of claim 1, wherein the 2D technique is selected from the group consisting of warping, painting, pixel tracking, planar tracking, rotoscoping, replacing with similar frames from the original actor, and compositing.

3. The method of claim 2, wherein using the 2D technique comprises the steps of:
   a. tracking the original actor of the speaking line iteratively, frame by frame, using a computer by picking a first facial feature of the original actor, and determining and following a position of the first facial feature of the original actor on a three-dimensional coordinate relative to an original camera, wherein at least two facial features are tracked and used to calculate rotation and skew;
   b. tracking the voice over actor of the speaking line iteratively, frame by frame, using the computer by picking a first facial feature of the voice over actor, and determining and following a position of the first facial feature of the voice over actor on a three-dimensional coordinate relative to a voice over camera;

c. assigning the voice over actor to the original actor, wherein the voice over actor becomes a desired lip and facial expression for the original actor; and d. using visemes from the voice over actor as a guide to modify a mouth movement of the original actor.

4. The method of claim 2, wherein the original actor's sequence of mouth movements from a first segment is replaced with the original actor's sequence of mouth movements from a second segment, wherein the original actor's sequence of mouth movements from the second segment matches the voice over actor's sequence of mouth movements speaking the speaking line in the native language in the first segment.

5. The method of claim 4, wherein the original actor's mouth movements from the second segment is modified from its original sequence, wherein the modification is selected from the group consisting of running the sequence faster, running the sequence slower, and running the sequence in reverse.

6. The method of claim 2, wherein the original actor's mouth movements is replaced with the still frame.

7. The method of claim 1, wherein when the original actor's movements involve significant perspective changes, at least one 3D technique selected from the group consisting of modeling, texturing and lighting of the original actor's facial features is used.

8. The method of claim 7, comprising the steps of:
a. tracking the original actor of the speaking line iteratively, frame by frame, using a computer by picking a first facial feature of the original actor, and determining and following a position of the first facial feature on a three-dimensional coordinate relative to an original camera, wherein at least two facial features are tracked and used to calculate rotation and skew;
b. tracking the voice over actor of the speaking line iteratively, frame by frame, using the computer by picking a first facial feature of the voice over actor, and determining and following a position of the first facial feature of the voice over actor on a three-dimensional coordinate relative to a voice over camera;
c. assigning the voice over actor to the original actor, wherein the voice over actor becomes a desired lip and facial expression for the original actor;
d. calculating a position, a movement, and a lens information of the original camera to recreate a new camera motion for the speaking line; and
e. performing a 3D match-move of the original actor's face to determine the original actor's position in the scene relative to the camera.

9. The method of claim 8, further comprising the step of creating a digital model of the shape and motion of a head of the original actor.

10. The method of claim 9, wherein the digital model is created using more than one image of the original actor from the original recording and creating a digital wire frame of a face of the original actor.

11. The method of claim 10, wherein the digital wire frame is animated to match the mouth movements of the voice over actor reciting the speaking line in the native language.

12. The method of claim 11, further comprising:
a. rotoscoping to extract the hair, skin, color and lighting from the original actor as captured in the original recording and projected onto the digital wire frame; and
b. rendering to match the new skin, lighting, and shadows to the original actor.

13. The method of claim 12, further comprising:
a. compositing the digital model with an original frame; and
b. utilizing a 2D technique to blend into the original actor's face.

14. The method of claim 1, further comprising compositing a picture-in-picture of each frame of the segment of the recorded video of the voice over actor with each frame of the corresponding segment of the original actor to determine accuracy of the lip synchronization.

15. A method for converting a foreign film into a native language, comprising:
a. for every segment of an original recording having a speaking line and associated facial expressions recorded at a specific perspective for every original actor in the foreign film:
  i. audio recording a voice over actor speaking the speaking line in a native language to create a native language audio recording;
  ii. video recording the voice over actor during the audio recording from a face-on camera angle to create a face-on video recording;
  iii. video recording the voice over actor during the audio recording from a matched camera angle to create a matched-angle video recording;
  iv. using an imagery selected from the group consisting of the face-on video recording and the matched-angle video recording as a visual guide to permit a digital artist to recreate native language visemes;
b. overlaying and comparing a segment of the original recording containing the speaking line with a corresponding segment of the matched-angle video recording of the voice over actor to create an exposure sheet to determine a viseme position for the native language audio recording;
c. choosing a best methodology to change an actively speaking original actor's visemes, the best methodology selected from the group consisting of a 2D technique and a 3D technique;
d. executing a conversion to change a mouth position of the actively speaking original actor to match the voice over actor reciting the speaking line to create a modified original actor;
e. performing quality control for an overall look, feel, and accuracy of the conversion to the native language;
f. comparing a resulting facial imagery of the modified original actor with the voice over actor to determine accuracy of the conversion; and
g. audio mixing to replace a voice track of the original actor with a voice track of the voice over actor, and integrate the voice over actor's voice track into an audio track for the original recording.

16. A method for converting a foreign film into a native language, comprising:
a. transcribing an original dialogue of an original actor having a speaking line in an original segment into a native language to create a transcribed speaking line;
b. recording a voice-over actor performing the transcribed speaking line at a current camera angle matching an original camera angle of the speaking line shown in the original segment, wherein the voice-over actor matches a timed-length of speaking of the original actor to create a transcribed segment;
c. creating a first set of exposure sheets comprising placement of original phonemes and corresponding visemes per exposed frame of the original segment to create a time code for frames as it relates to the original phonemes;
d. creating a second exposure sheet based on a waveform of the voice over actor's recording to map out new phonemes and corresponding visemes of the transcribed speaking line;
e. creating animated visemes to replace visemes of the original actor, wherein the technique used to create the animated visemes is selected from the group consisting of 2D methodology and 3D methodology;
f. blending a new element with existing faces to match discrepancies; and
g. replacing an original audio track with the speaking line with a new audio track with the transcribed speaking line;
h. comparing the original segment with the transcribed segment by using a technique selected from the group consisting of picture-in-picture, split screen, or ghost image overlay; and
i. using the comparison to check phoneme positions of the speaking line and determining a best lip-sync for the transcribed speaking line.

17. The method of claim 16, further comprising creating still frames of neutral facial expression of the original actor from the foreign film, in which the original actor is not speaking and is not making any facial expressions for every shot in which the original actor appears.

18. The method of claim 17, further comprising creating additional still frames if a perspective view of the original actor changes within the original segment.

19. The method of claim 16, wherein creating animated visemes comprises original visemes of the original actor shifted from an original frame to a different frame within the foreign film.

* * * * *